United States Patent Office
3,412,835
Patented Nov. 26, 1968

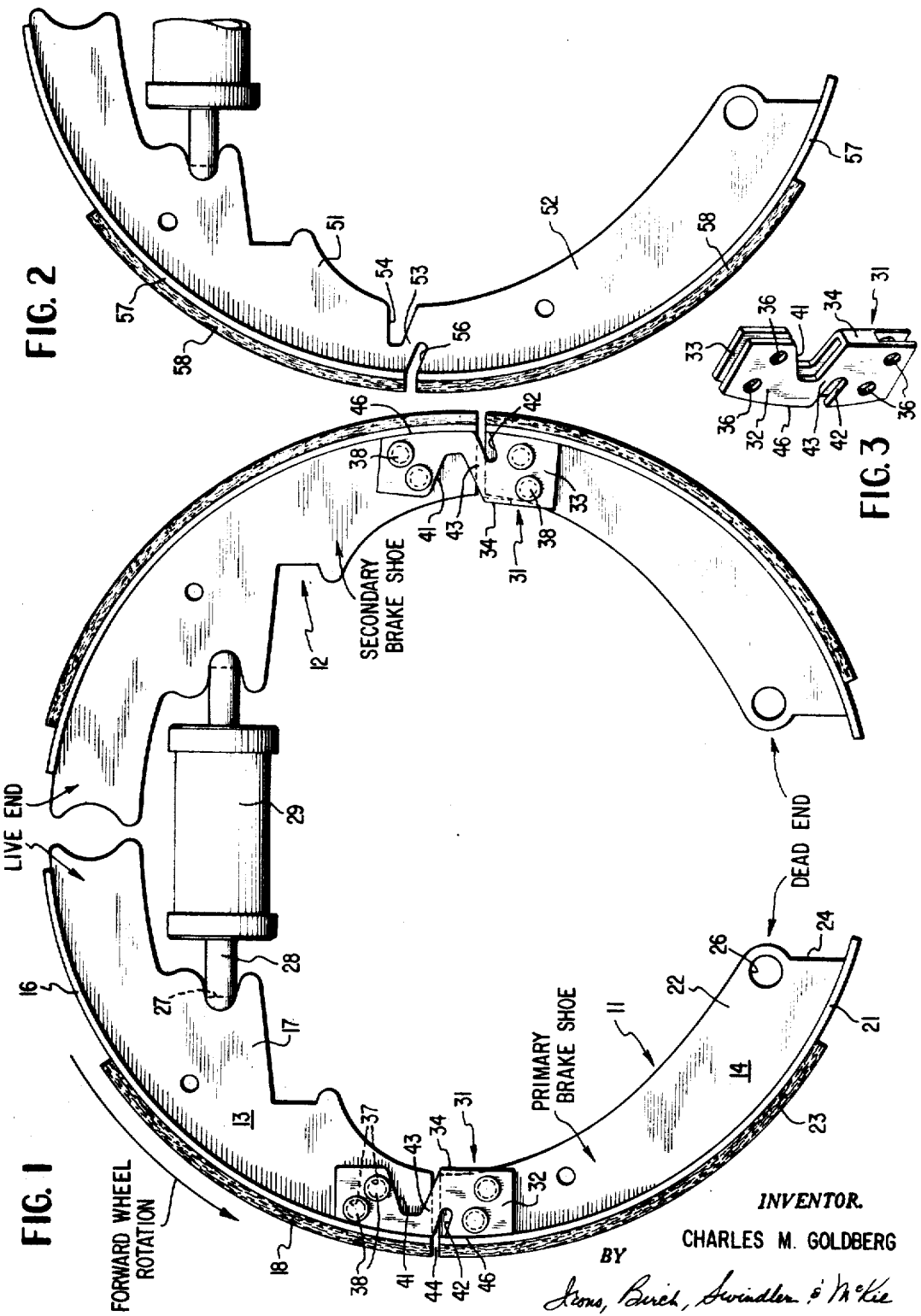

3,412,835
FLEXIBLE FRICTION SHOE
Charles Morley Goldberg, 6 S. Penn St.,
Wheeling, W. Va. 26003
Filed Sept. 14, 1966, Ser. No. 579,292
7 Claims. (Cl. 192—107)

ABSTRACT OF THE DISCLOSURE

A brake or clutch friction unit assembly having separate arcuate shoe sections resiliently interconnected in longitudinal end to end relation by a spring portion which extends diagonally at an acute angle to the adjoining ends of the shoe sections so that the shoe sections may move relative to one another and assume a curvature substantially corresponding to the arc of curvature of an associated brake or clutch drum as the assembly is moved into frictional engagement therewith.

State of the prior art

In brake or clutch structures it is desirable to have uniform engagement of the friction lining material with the associated brake or clutch drum throughout the entire surface area of the lining material. Ideally, there should be a fast, graduated application of force resulting in uniform engagement at all points on the frictional lining material so that as a greater brake or clutch actuating force is applied, this force is distributed uniformly over the entire area of the frictional lining material. When these theoretically ideal lining engagement conditions are met, hot spots in the lining material caused by non-uniform lining engagement are avoided. This results in cooler operation of the structure and increased life of the friction lining material and drum. Furthermore, less brake or clutch force is required to perform the braking or clutching operation, and vibration is minimized.

With the known rigid arcuate brake shoes the pressure engagement of the lining material with the drum often is not uniform. Instead, it most frequently is concentrated at the center or toward the so called "dead-end" of the shoe when the brake actuating force is applied. This follows from the fact that the fixed arc of the shoe, having a smaller radius of curvature than that of the drum which it is to engage, forms a lever which pivots about the anchor pin or dead-end of the shoe. Thus, as the lining material is urged into engagement with the drum, the shoe may not adjust to the curvature of the drum or compensate for lining wear. This non-uniform pressure engagement results in overheating of the brake structure, spotty lining wear and produces lining hot spots.

The prior art brake and clutch structures which have attempted to solve the problems discussed above have normally been unduly complex and expensive. Consequently, there is a need for a simple frictional brake and clutch assembly which is efficient and which effectively provides uniform engagement of the friction lining material with the drum throughout the entire surface area of the lining material.

Objects

It is an object of the present invention to provide new and improved apparatus for performing braking or clutching operations.

It is another object of the invention to provide a brake or clutch structure which maintains uniform pressure engagement of the friction lining material with the associated drum throughout the entire surface area of the lining material so as to obtain maximum energization between the friction lining and the drum surface.

It is still another object of the invention to provide a brake or clutch structure which permits the lining material to wear evenly, avoids hot spots in the lining material, and minimizes vibration in the structure.

It is a further object of the invention to provide a brake and clutch structure which provides the necessary frictional engagement and requires a minimum amount of actuating force.

It is still a further object of the invention to provide a friction unit assembly which includes at least two separate arcuate shoe sections which are resiliently interconntected thereby permitting longitudinal expansion and contraction depending upon the wear of the friction lining material and the forces which are applied to the shoe sections.

Another object of the invention is to provide a friction unit assembly including at least two arcuate shoe sections which are interconnected by a flat resilient spring which urges the assembly into an arc having a constant radius and which also acts as a lever to pivot the shoe sections outwardly into engagement with an associated drum upon the application of a brake or clutch actuating force.

In one embodiment the flat spring includes two generally parallel S-shaped portions which are adapted to straddle the web portions of the shoe sections. The S-shaped portions are connected together with a crosspiece and are secured to the webs to hold the webs in spaced end to end relationship.

In another embodiment the flat spring is formed by providing a pair of oppositely directed notches in the web which divide the web and the shoe into at least two sections. One of the notches is directed radially inward and the other notch is directed radially outward leaving a narrow section of web material therebetween which permits flexing of the two shoe sections toward and away from each other. The section of web material also acts as a spring to retain the two shoe sections in an arc having a constant radius of curvature.

Drawings

Other objects, advantages and aspects of the invention will become apparent by reference to the following detailed description and drawings of specific embodiments thereof, wherein:

FIG. 1 is a side elevational view of two brake shoe assemblies each of which includes two shoe sections interconnected by means of a flat spring according to the present invention;

FIG. 2 is a side elevational view of another embodiment of the invention wherein a flat spring is formed integral with the brake shoe assembly by providing notches in the web portion; and FIG. 3 is a perspective view of the spring shown in FIG. 1 for interconnecting two brake shoe sections in end to end relationship.

Description of the invention

In general, the invention relates to a brake or clutch structure embodying a friction unit assembly for selective engagement with a drum. It is to be understood that the invention is applicable to both brakes and clutches although hereinafter the invention will be described with reference to a brake structure, by way of example. The assembly includes at least two arcuate shoe sections which have arcuate segments on which is mounted frictional lining material. The shoe sections also each have a web element which extends lengthwise of the arcuate segments and radially inwardly therefrom.

Before referring to the specific details of the friction unit assembly illustrated in the drawings, it is to be understood that the drawings are intended only to show the salient features of the resilient means for interconnecting the separate arcuate shoe sections. The drawings do not illustrate the details of the various means which may be employed in anchoring the friction unit assembly to form one end of such an assembly into what is termed the dead-end in the usual brake installation. Also, while one example of a force-applying mechanism is shown, it is to be understood that various other mechanisms which have not been illustrated may be employed in utilizing the friction unit assembly of this invention for effecuating braking. The end anchoring device or the dead-end of the assembly and the particular force applying mechanism employed at the so-called live-end of the assembly may take a wide variety of forms, and the extent to which they are illustrated herein is merely by way of example as they form no part of the instant invention.

It is to be recognized in carrying into practice the teaching of the instant invention described hereinafter, one end of the friction unit assembly is anchored by suitable means which will form this end into the dead-end of the assembly. Likewise, the other end of such assembly is connected to a suitable mechanism to apply brake actuating force such that this end of the assembly forms the live-end. Additionally, it is to be noted that although a single interconnection between the arcuate shoe sections is specifically illustrated, the friction unit assembly may be made up of two or more arcuate shoe sections interconnected by the spring means as discussed and described in detail hereinafter.

In FIG. 1 there is shown a pair of brake shoe assemblies which according to normal terminology may be referred to as the primary brake shoe assembly and the secondary brake shoe assembly, these being designated 11 and 12, respectively. The primary assembly 11 comprises two arcuate shoe sections 13 and 14. The shoe section 13 includes a table 16 which is in the shape of a segment of a cylinder. Extending radially inwardly from the table 16 and mounted perpendicular thereto is a web designated 17. Suitable friction lining material 18 is secured to the outer face of the table 16 by conventional means, such as rivets or bonding material (not shown). The shoe section 14 includes similar component parts including a table 21, a web 22 and friction lining material 23. The web 22 has an extended portion, designated 24, which is provided with an aperture 26 for connection to an anchor pin (not shown) or may be found to accommodate a "star" adjustment device between the primary and secondary shoe assemblies such as used in Bendix type brake installations. The webs 17 and 22 provide a substantial amount of rigidity to the table sections 16 and 21 with a cross-section taken through either of the shoe sections 13 or 14 and their respective webs appearing generally T-shaped. The web 17 is also provided with a notch 27 for receiving the actuating end of a push rod 28 of a hydraulically actuated wheel cylinder 29. The structural details of the secondary brake shoe assembly 12 are substantially the same as the primary brake shoe assembly 11 and need not be discussed in detail.

As shown in FIGS. 1 and 3, the shoe sections 13 and 14 are interconnected by a flat spring clip, designated 31. The spring clip 31 includes two generally S-shaped sections 32 and 33 which are connected by a crosspiece 34. The sections 32 and 33 each have four aligned apertures, designated 36, and the webs of shoe sections 13 and 14 have corresponding apertures 37. The spring clip is connected to the adjoining ends of the webs 13 and 14 by rivets 38 which pass through the aligned apertures 36 and 37. In this manner the shoe sections 13 and 14 are held in a desired relationship during a braking operation while braking forces are transmitted from the live end of shoe section 13 to the dead-end of shoe section 14. It is to be understood that connecting means other than rivets can be used as would be apparent to one skilled in the art.

The spring clip 31 has cut-out portions 41 and 42 to define each of the S-shaped sections 32 and 33. These cut-out portions 41 and 42 leave narrow resilient portions 43 therebetween which permit the shoe sections 13 and 14 to move relative to one another, into an expanded arc which conforms to the curvature of the associated drum. These portions 43 act as springs to resiliently interconnect the shoe sections. Also by reasons of their direction or position in bridging the gap between the ends of shoe sections 13 and 14, the portions 43 functions as lever arms in levering the end of shoe section 13 outwardly toward the drum relative to the adjoining end of shoe section 14. It should be noted that the resilient spring clip 31 is dimensioned such that a gap 44 is provided between the ends of the shoe sections 13 and 14 when the clip connects the sections to permit expanded or contracted relative movement therebetween. The outer edge of the spring clip 31 is arcuate as shown at 46 so as to conform generally to the inner curved surfaces of the tables 16 and 21.

The spring clips may be constructed of any suitable material such as spring steel which permits repeated bending of the portions 43 with no permanent deflection. It should be apparent that the spring clip 31 should not permanently buckle, or be incapable of effectively transmitting the forces between the shoe sections 13 and 14 during the actuation of the friction unit assembly.

In operation, the spring clip 31 provides several functions with respect to the friction unit assembly both during actuation and in a released deactuated condition. It will be seen that, in its deactuated condition, that is where brake force is not applied to the friction unit assembly, the elements will assume the position as shown in FIG. 1. When deactuated, the spring clip 31 holds the shoe sections 13 and 14 in an arc which has a generally fixed radius of curvature out of contact with the associated drum. In this respect it is to be understood that the entire assembly is normally withdrawn by conventional shoe retracting springs (not shown) as are well known in the brake art. However, the flat spring clip 31 aids in providing a positive return for the shoe sections 13 and 14 and the friction lining material 18 and 23 so that the lining material is out of engagement with the drum when the brake is released.

As actuating or operating force is applied by any suitable actuating mechanism, such as 29, the force transmitted from the actuator to the live end of the friction unit assembly causes the shoe sections 13 and 14 to pivot and expand outwardly into an arc conforming to that of the drum surface. This outward pivoting which occurs between the two sections is resisted by the flat spring clip 31 and particularly the portions 43 thereof since this pivoting action tends to move the sections 13 and 14 away from their original fixed arc. As the friction unit assembly expands, the lining material engages the drum surface to provide the braking action. It should be noted that at the same time the shoe sections are pivoting outwardly, there is a movement of the adjoining ends of the shoe sections 13 and 14 toward one another. This results from the force applied longitudinally along the arc of the shoe section 13 from the force applying mechanism 29 at the live end. This movement results in the end of the shoe section 13 being urged radially outwardly with respect to the adjoining end of the shoe section 14. As this takes place, the excess lining engagement pressure on the dead-end shot section 14 (customary in conventional brake shoes) is transferred to the shoe section 13. However, this relative movement between the adjoining ends is at all times restrained by the resilient portions 43 of the flat spring clip 31 which urges the shoes into their original fixed arc. Thus, the tendency of the shoe sections to buckle excessively inwardly is effectively eliminated.

During application of the actuating force to the live end, the assembly pivots around its dead or anchored end to move the lining material into engagement with the drum surface. The application of the actuating force and the consequent pivoting at the dead-end of the assembly tends to make the arcuate shoe sections 13 and 14 buckle inwardly in the center. This tendency to buckle inwardly is effectively avoided by the use of the spring clip 31 connecting member. The spring clip 31 permits the shoe sections 13 and 14 to move relative to each other longitudinally while still transmitting the actuating force therebetween so that the braking force is evenly distribtued throughout the entire assembly. The action of the spring clip 31 just described, gives a uniformly controlled transfer of force between the adjoining ends of the shoe sections as the braking force is transmitted to the friction unit assembly causing the friction lining material to unifoormly engage the inner drum surface at all points. Thus, the braking operation is performed with the least possible application of force. It follows that hot spots, wear, and vibration are all minimized in utilization of the friction unit assembly.

In another embodiment, shown in FIG. 2, there is provided a pair of web sections 51 and 52. The web sections are connected together by a resilient spring-like portion 53. In practice, the spring-like portion 53 is formed by providing notches 54 and 56 in a one piece, continuous web. It will be noted that the notch 54 extends radially outward, while the notch 56 extends radially inward. Also, the notch 56 extends through the table 57 of the shoe assembly to divide the table into two separate sections. Suitable friction lining material 58 is secured to the table sections by any conventional means, such as rivets (not shown).

The operation of the embodiment shown in FIG. 2 is similar to that shown in FIG. 1. Thus, the spring-like portion 53 retains the web sections 51 and 52 into an arc having a constant radius of curvature and out of contact with the associated drum while in the deactuated position. Upon actutaion the spring-like portion 53 provides a deflection area and simultaneously transmits the braking forces evenly around the friction lining material 58 in the same manner as described hereinbefore. This embodiment has the advantage of simplicity in manufacture. If the spring-like portion 53 becomes worn or damaged, it is possible to repair the brake shoe with a spring clip 31 such as is shown in FIG. 1.

It is to be understood that in some applications, such as heavy duty brakes for trucks, there is provided a double web construction as opposed to the single web shown in FIGS. 1 and 2. More particularly, the brake shoe includes two parallel, reenforcing webs which are mounted perpendicular to the respective table in order to provide greater rigidity and strength. Where such dual webs are provided, it is possible to use a flat spring clip such as that shown in FIG. 3 either with or without the crosspiece 34. The exact shape of the flat spring is not critical so long as there are provided opposed notches having a portion of resilient material therebetween so as to permit relative displacement between the shoe sections and proper transmission of the braking forces.

Where there are dual webs provided, it is also possible to secure the flat spring clip to the inner sides of the webs which face each other. In particular, pins can be welded between the opposing faces of the webs and the spring clips can be mounted thereon in such a manner that they can turn slightly on the pins, as in FIG. 1. In such a case it is desirable that the spring clips be held spaced apart against their respective webs. This can be done by having a crosspiece, such as 34 or by placing a spacer, such as a sleeve on the pins. In the preferred form the spring clips should not be rigidly connected to the webs since it is desirable that there be some turning movement therebetween during a braking operation. Thus, by welding or otherwise securing the pins to the webs and then mounting the spring clips on the pins, such turning movement is possible.

Although the drawings only illustrate an internal brake or clutch structure, it will be understood that the principles of the present invention are equally applicable to external brake or clutch structures. Specific illustration of an external brake or clutch friction unit assembly embodying the present invention is considered unnecessary since the basic characteristics are adequately illustrated by the internal brake or clutch friction unit assembly shown and described above.

Although the present invention has been illustrated and described with respect to specific embodiments, it will be understood that various modifications may be made by persons skilled in the art without departing from the spirit of the invention which is defined solely by the appended claims.

What is claimed is:

1. A friction unit assembly for a brake or clutch structure, which comprises:
   at least two arcuate shoe sections disposed in longitudinal end to end alignment and movable as a unit into engagement with a drum surface upon an operating force being applied to said assembly, each of said shoe sections having one arcuately curved face thereof adapted to receive friction material with the arcuately curved face of one section forming a continuation of the arc curvature of the arcuately curved surface of the other section to provide an essentially unobstructed friction material receiving surface on said assembly in the form of a partial cylinder;
   at least one web portion on each shoe section extending perpendicular to and radially inward of the arcuately curved face of the section; and
   resilient means including at least one spring portion connecting adjoining ends of the webs of said shoe sections in end to end relation, said spring portion lying in a plane substantially perpendicular to the arcuately curved faces of the shoe sections and disposed to extend from adjacent the arcuately curved face at the end of one shoe section toward the radially inner edge of the web at the end of the adjoining shoe section.

2. Apparatus as recited in claim 1 wherein said resilient means includes a clip formed with two generally parallel S-shaped flat sections, said clip being adapted to straddle the web, and each of said S-shaped sections being secured to adjoining ends of the webs to hold the webs in end to end relation.

3. Apparatus as recited in claim 2 wherein said S-shaped portions are connected together with a crosspiece which in the assembled position is located radially inward of the webs.

4. Apparatus as recited in claim 2 wherein the mid segment of each of said S-shaped sections provides a spring portion, each said spring portion extending inwardly from the arcuately curved surface of the shoe section to which the operating force is applied and toward the adjoining end of the adjacent shoe section.

5. Apparatus as recited in claim 1 wherein said spring portion is formed integrally with the webs.

6. In a friction unit assembly for a brake or clutch structure, which includes at least two arcuate shoe sections, one of which forms the live end and the other of which forms the dead end of said assembly, disposed in longitudinal end to end alignment and movable as a unit into engagement with a drum surface upon an operating force being applied to the live end of said assembly, each of said shoe sections having one arcuately curved face thereof adapted to receive friction material with the arcuately curved face of one section forming a continuation of the arc of curvature of the arcuately curved face of the other section to provide an essentially unobstructed friction material receiving surface on said assembly in the form of a partial cylinder, said shoe sections each having at least one web section which is perpendicular to and extends radially inward from the arcuately curved face of said shoe sections, the improvement which comprises:

at least one flat resilient spring portion connecting the adjoining ends of the webs of said shoe sections in end to end relation, said spring portion lying in a plane substantially perpendicular to the arcuately curved faces of said shoe sections and disposed to extend from adjacent the arcuately curved face at the end of one shoe section toward the radially inner edge of the web at the end of the adjoining shoe section, said portion urging the shoe sections into a fixed arc out of engagement with the drum when the assembly is deactuated and providing for pivotal movement between the shoe sections when the assembly is actuated so that the engagement of the shoe sections with the associated drum is substantially uniform throughout the surface area of the friction lining material.

7. Apparatus as recited in claim 6 wherein said resilient portion extends diagonally across the junction between the adjoining ends of the shoe sections with the radially outer end of said portion connected to the live end shoe section and the radially inner end of said portion connected to the dead end shoe section to urge the live end shoe section radially outwardly with respect to the dead end shoe section upon application of brake operating force to equalize substantially the engagement of the two shoe sections with the associated drum.

References Cited

UNITED STATES PATENTS

| 1,761,933 | 6/1930 | Olivier. |
| 2,072,412 | 3/1937 | Tarbox. |
| 2,910,162 | 10/1959 | Goldberg. |
| 3,001,622 | 9/1961 | Goldberg _____ 188—249 XR |

FOREIGN PATENTS 583,956   1/1947   Great Britain.

BENJAMIN W. WYCHE III, *Primary Examiner.*